United States Patent

Cassese et al.

Patent Number: 5,135,283
Date of Patent: Aug. 4, 1992

[54] HEAD REST EXTENSION

[76] Inventors: Daniel S. Cassese, 28 Elva Rd., North Weymouth, Mass. 02191-2003; George Spector, 233 Broadway Rm 3815, New York, N.Y. 10007

[21] Appl. No.: 733,617

[22] Filed: Jul. 22, 1991

[51] Int. Cl.⁵ ............................................. A47C 7/38
[52] U.S. Cl. .................................... 297/397; 297/219
[58] Field of Search ............... 297/397, 219, 229, 220, 297/223

[56] References Cited

U.S. PATENT DOCUMENTS

| | | | |
|---|---|---|---|
| 3,369,786 | 2/1968 | Schloemer | 297/397 X |
| 4,114,948 | 9/1978 | Perkey | 297/397 |
| 4,862,536 | 9/1989 | Pruit | 297/397 X |
| 4,971,393 | 11/1990 | Maisenhalder | 297/397 |
| 5,015,036 | 5/1991 | Fergie | 297/397 |

Primary Examiner—Peter R. Brown

[57] ABSTRACT

A headrest extension is provided for a seat of a type having an existing built-in headrest supported by a stanchion extending upwardly from the top of a seat back, of the seat. The headrest extension consists of a cushion having a body of relatively soft material and a mechanism for attaching the cushion to the existing built-in headrest so that when a person sits in the seat the head of the person can rest comfortably against the cushion.

2 Claims, 2 Drawing Sheets

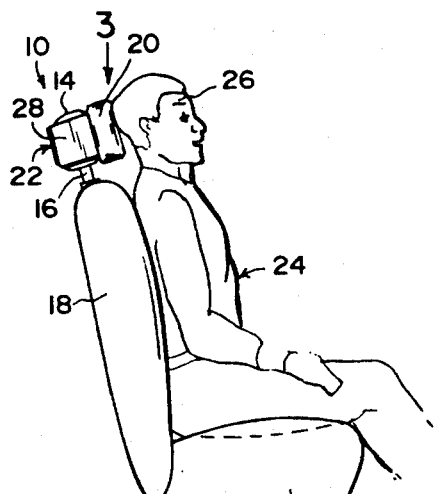
Fig. 1
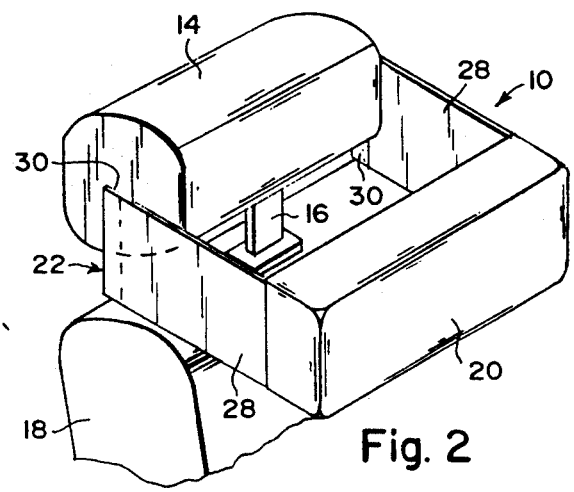
Fig. 2
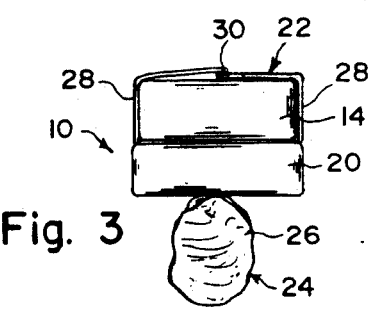
Fig. 3
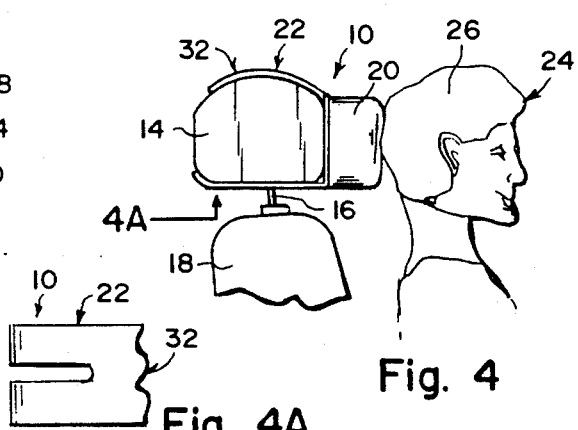
Fig. 4
Fig. 4A
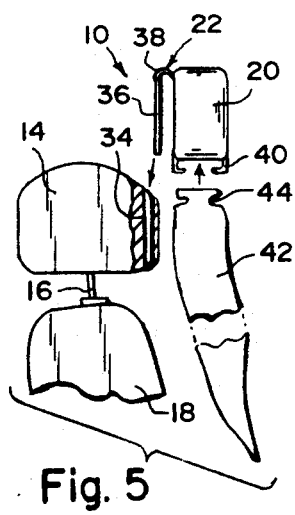
Fig. 5
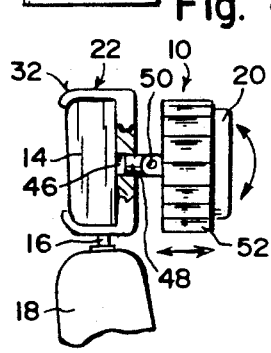
Fig. 6
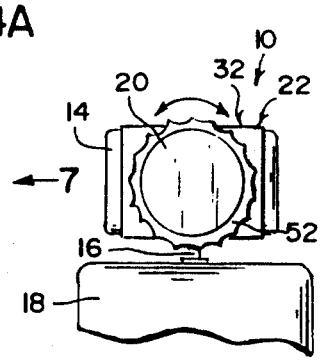
Fig. 7

HEAD REST EXTENSION

BACKGROUND OF THE INVENTION

The instant invention relates generally to motor vehicle accessories and more specifically it relates to a headrest extension which provides a cushion that is attachable to the existing built-in headrest of a seat.

There are available various conventional accessories which do not provide the novel improvements of the invention herein disclosed.

SUMMARY OF THE INVENTION

A primary object of the present invention is to provide a headrest extension that will overcome the shortcomings of the prior art devices.

Another object is to provide a headrest extension that includes a cushion which is attachable to the existing built-in headrest of a seat so that when a person sits in the seat the head of the person can rest comfortably against the cushion.

An additional object is to provide a headrest extension that includes a shoulder-back contoured extension member attachable to and extending downwardly from the bottom of the cushion to aid in helping a person with back pain to sit more comfortably in the seat.

A further object is to provide a headrest extension that is simple and easy to use.

A still further object is to provide a headrest extension that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side elevational view showing the instant invention attached to the existing built-in headrest of a seat occupied by a user.

FIG. 2 is a perspective view of the instant invention partly removed from the headrest.

FIG. 3 is a top view taken in direction of arrow 3 in FIG. 1.

FIG. 4 is a side elevational view of a second embodiment of the invention installed on the headrest.

FIG. 4A is a bottom view with parts broken away taken in direction of arrow 4A in FIG. 4.

FIG. 5 is an exploded side elevational view with parts in section and broken away, showing a third embodiment of the invention.

FIG. 6 is a side elevational view with parts in section and broken away showing a fourth embodiment of the invention being adjustable to the existing built-in headrest.

FIG. 7 is a front view taken in direction of arrow 7 in FIG. 6, showing the wavy casing about the cushion so that a person can turn it for adjustment.

DETAILED DESCRIPTION OF THE PREFERRED EMBODIMENTS

Figure 8:
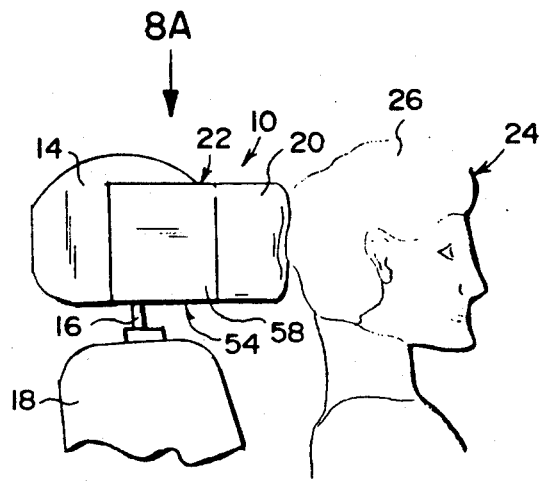
FIG. 8 is a side elevational view showing a fifth embodiment of the invention installed on the headrest.

Turning now descriptively to the drawings, in which similar reference characters denote similar elements throughout the several views, the Figures illustrate a headrest extension 10 for a seat 12 of the type having an existing built-in headrest 14 supported by a stanchion 16 extending upwardly from the top of a seat back 18 of a seat 12. The headrest extension consists of a cushion 20 having a body of relatively soft material and mechanism 22 for attaching the cushion 20 to the existing built-in headrest 14 so that when a person 24 sits in the seat 12, the head 26 of the person 24 can rest comfortably against the cushion 20.

As best shown in FIGS. 1, 2 and 3, the attaching mechanism 22 includes a pair of belts 28 with each extending from an opposite side of the cushion 20. Hook and loop fabric fastener strips 30 are affixed to the distal ends of the belts 28 so that the distal ends can be attached to each other when the belts 2 are wrapped around the existing builtin headrest 14.

As shown in FIGS. 4, 6 and 7, the attaching mechanism 22 includes a C-shaped spring clamp member 32 affixed to the rearward end of the cushion 20, which fits onto the existing built-in headrest 14.

FIG. 5 shows the attaching mechanism 22 including the existing built-in headrest 14 having a vertical slot 34 proximate its forward end thereof and a flat bar 36 having a hooked end 38 affixed to the top rearward end of the cushion 20. The flat bar 36 will extend downwardly parallel with the rearward end of the cushion 20 and fit into the vertical slot 34 in the existing built-in headrest 14. A channel 40 may be formed in the bottom end of the cushion 20. A shoulder-back contoured extension member 42 has a top groove 44 which can be attached to and extend downwardly from the channel 40 to aid in helping a person 24 with back pain to sit more comfortably in the seat 12.

A headrest extension 10, in FIGS. 6 and 7, further includes the C-shaped spring clamp member 32 having a threaded hole 46 therein. A threaded shank 48 is engagable within the threaded hole 46, while a pivot joint 50 is affixed to the distal end of the threaded shank 48. A wavy circular casing 52 is about the cushion 20, with the pivot joint 50 connected to the rearward end of the casing 52. A person 24 can adjust the angle of the cushion 20 via the pivot joint 50 and can adjust the distance of the cushion 20 form the existing built-in headrest 14 by rotating the wavy circular casing 52, thereby causing the threaded shank 48 to move inwardly and outwardly in the threaded hole 46.

Figure 8A:
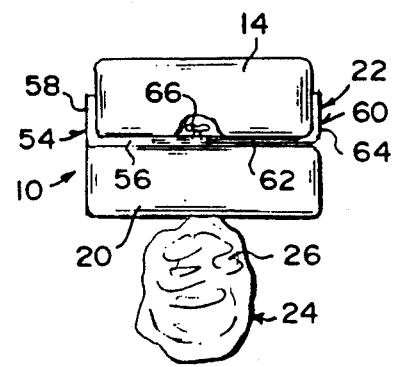
FIG. 8A is a top view taken in direction of arrow 9A in FIG. 8.

In FIGS. 8 and 8A the attaching mechanism 22 includes a first L-shaped member 54, having a first leg 56 affixed to the rearward end of the cushion 20 and a second leg 58 extending therefrom. A second L-shaped member 60 has a first leg 62 telescopically engagable within the first leg 56 of the first L-shaped member 54 and a second leg 64 extending therefrom. At least one wing bolt 66 is threaded into the first leg 56 of the first L-shaped member 54 and into the first leg 62 of the second L-shaped member 60 so as to retain the second L-shaped member 60 to the first L-shaped member 54 to fit onto the sides of the existing built-in headrest 14.

Figure 9:
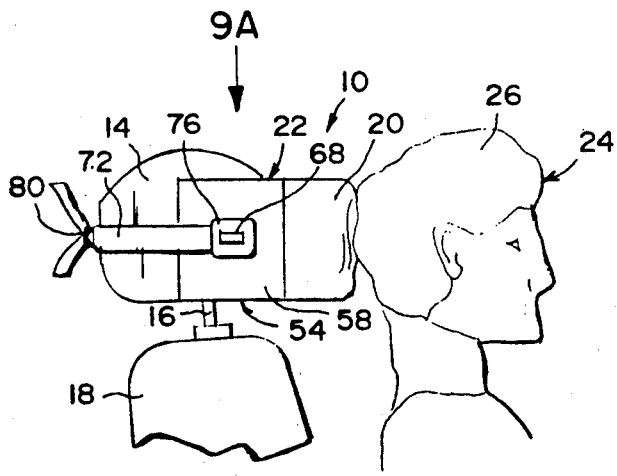
FIG. 9 is a side elevational view showing a sixth embodiment of the invention installed on the headrest.
Figure 9A:
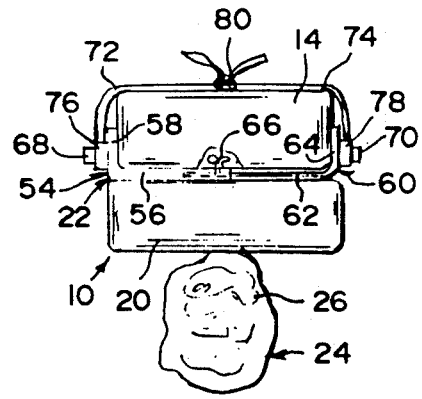
FIG. 9A is a top view taken in direction of arrow 9A in FIG. 9.

FIGS. 9 and 9A show the attaching mechanism 22 further including a pair of flat pins 68 and 70. The first flat pin 68 is mounted to the side of the second leg 58 of the first L-shaped member 54 and extends outwardly therefrom. The second flat pin 70 is mounted to the side of the second leg 64 of the second L-shaped member 60 and extends outwardly therefrom. A pair of belt 72 and 74 are provided. The first belt 72 has a slotted buckle end 76 which fits onto the first flat pin 68. The second belt 74 has a slotted buckle end 78 which fits onto the second flat pin 70 so that the free ends of the belts 72 and 74 can be wrapped around the existing built-in headrest 14 and tied together at 80.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A headrest extension for a seat of the type having an existing built-in headrest supported by a stanchion extending upwardly from the top of a seat box, said headrest extension comprising:
   a) a cushion having a body of relatively soft material; and
   b) means for attaching said cushion to the existing built-in headrest so that when a person sits in the seat the head of the person can rest comfortably against said cushion;
   c) the existing built-in headrest having a vertical slot proximate its foreward end thereof; and
   d) said means for attaching comprising a flat bar having a hooked end affixed to the top rearward end of said cushion so that said flat bar will extend downwardly parallel with the rearward end of said cushion and fit into the vertical slot in the existing built-in headrest.

2. A headrest extension as recited in claim 1, further including:
   a) a channel formed in the bottom end of said cushion; and
   b) a shoulder-back contoured extension member having a top groove attached to and extending downwardly from said channel to aid in helping a person with back pain to sit more comfortably in the seat.

* * * * *